(12) United States Patent
Gilliland (10) Patent No.: US 10,851,896 B2
(45) Date of Patent: Dec. 1, 2020

(54) SEALS FOR ALLOWING OFF-AXIS MOTION WHILE MAINTAINING SEALED CONNECTION

(71) Applicant: Bell Helicopter Textron Inc., Fort Worth, TX (US)

(72) Inventor: Colton Gilliland, Northlake, TX (US)

(73) Assignee: Textron Innovations Inc., Providence, RI (US)

( * ) Notice: Subject to any disclaimer, the term of this patent is extended or adjusted under 35 U.S.C. 154(b) by 370 days.

(21) Appl. No.: 15/898,541

(22) Filed: Feb. 17, 2018

(65) Prior Publication Data

US 2019/0257425 A1 Aug. 22, 2019

(51) Int. Cl.
*F16J 15/04* (2006.01)
*B64C 3/56* (2006.01)

(52) U.S. Cl.
CPC ............. *F16J 15/04* (2013.01); *B64C 3/56* (2013.01); *B64C 2201/102* (2013.01)

(58) Field of Classification Search
CPC ........ F16J 15/04; B64C 3/56; B64C 2201/102
See application file for complete search history.

(56) References Cited

U.S. PATENT DOCUMENTS

| | | | | |
|---|---|---|---|---|
| 5,558,299 A | * | 9/1996 | Veile | B64C 3/56 244/49 |
| 2008/0047100 A1 | * | 2/2008 | Gitnes | B64C 3/56 16/221 |
| 2019/0256190 A1 | * | 8/2019 | Olson | B64C 3/56 |
| 2019/0271398 A1 | * | 9/2019 | Olson | F16H 57/043 |
| 2019/0277392 A1 | * | 9/2019 | Gilliland | B64C 29/0033 |
| 2019/0283858 A1 | * | 9/2019 | Mueller | B64C 11/28 |
| 2019/0301537 A1 | * | 10/2019 | Olson | B64C 3/56 |
| 2019/0323563 A1 | * | 10/2019 | Gilliland | F16D 23/12 |
| 2019/0338810 A1 | * | 11/2019 | Gilliland | B64C 27/28 |

* cited by examiner

*Primary Examiner* — Rodney A Bonnette
(74) *Attorney, Agent, or Firm* — Lightfoot & Alford PLLC (57) ABSTRACT

Systems and methods include providing an aircraft with a fuselage and a wing assembly rotatable relative to the fuselage about a stow axis between a flight position and a stowed position. The aircraft includes a drive component having a retractable driveshaft that selectively engages the mid-wing gearbox via axially translatable motion along a rotation axis when the wing assembly is in the flight position. The mid-wing gearbox is misaligned with the retractable driveshaft when the wing assembly is in the stowed position. A seal is coupled to the drive component at a first end and the mid-wing gearbox at a second end and deploys in order to maintain a sealed connection between the drive component and the mid-wing gearbox when the wing assembly is transitioned between the flight position and the stowed position.

20 Claims, 11 Drawing Sheets

SEALS FOR ALLOWING OFF-AXIS MOTION WHILE MAINTAINING SEALED CONNECTION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Aircraft and/or other vehicles and machinery often include many dynamic components that interface with other similar components. Some of these dynamic components include the capability to be selectively engaged and disengaged in order to alter the configuration or operation of another component of the aircraft and/or other vehicle or machinery. When disengaged, intricate features such as gear splines, fluid passages, and the like may be exposed to outside environmental elements. These outside environmental elements may contaminate the exposed features, which may lead to an increased buildup of contamination, oxidation, wear, and/or ultimate failure of these components.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
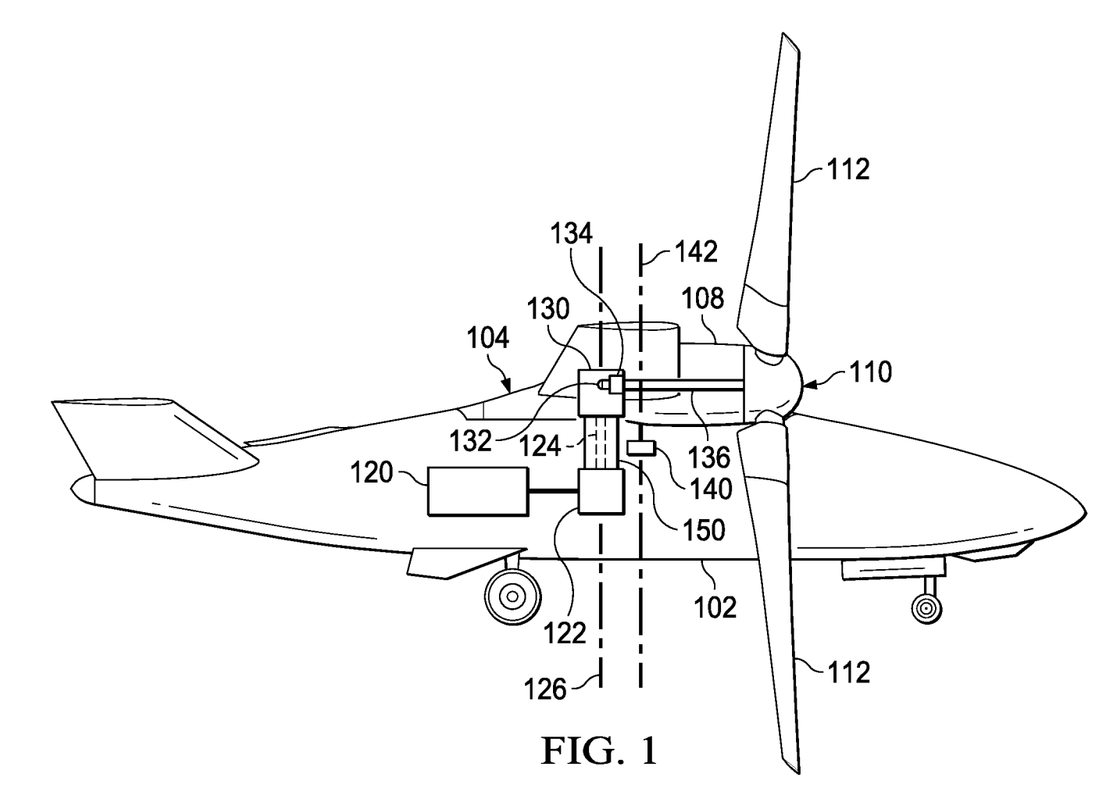
FIG. 1 is a side view of an aircraft according to this disclosure configured in a flight configuration.
Figure 2:
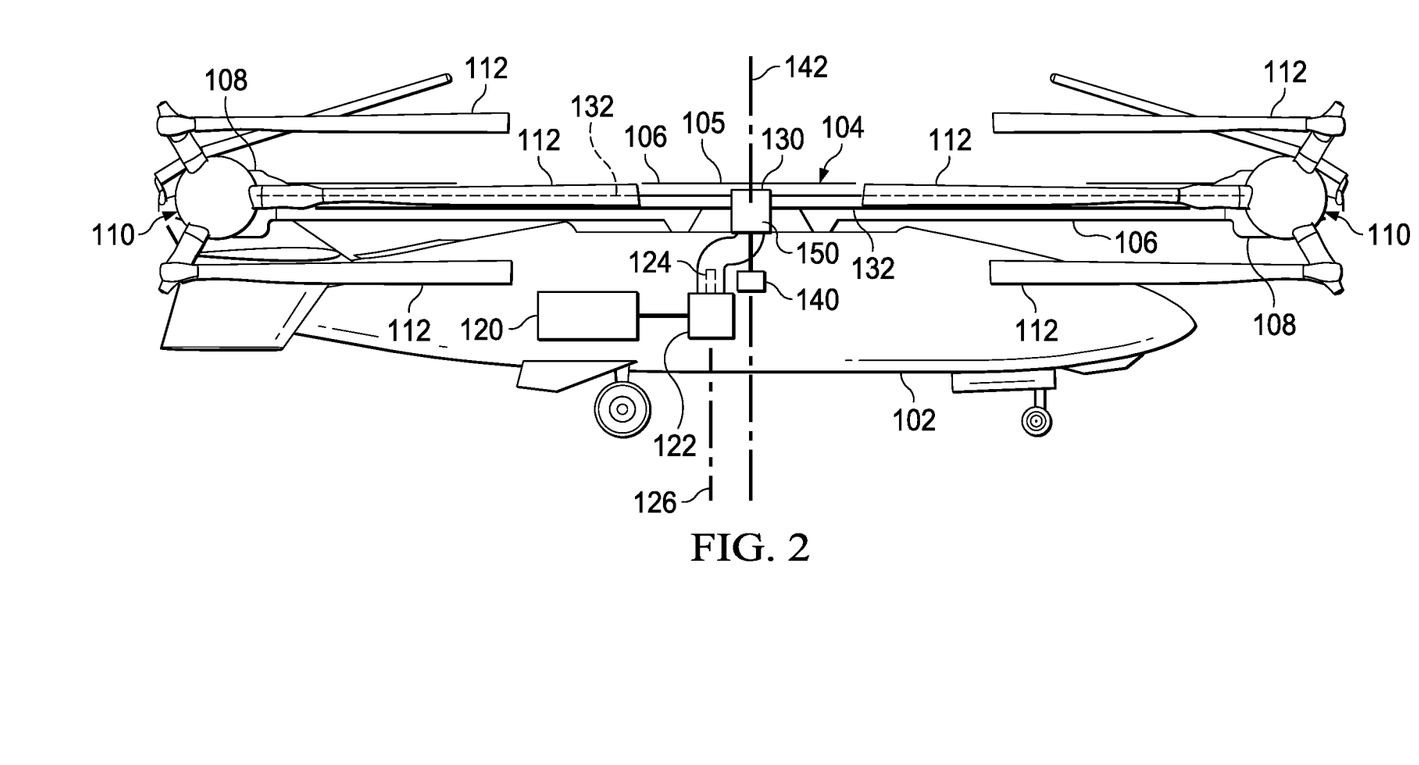
FIG. 2 is a side view of the aircraft of FIG. 1 configured in a stowed configuration.

Referring now to FIGS. 1 and 2, side views of an aircraft 100 configured in a flight configuration and a stowed configuration, respectively, are shown according to this disclosure. In the embodiment shown, aircraft 100 is a tiltrotor. However, in other embodiments, aircraft 100 may be any other type of aircraft (e.g. fixed-wing aircraft, vertical take-off and landing (VTOL) aircraft, "manned" or "unmanned" drone, etc.). Aircraft 100 generally comprises a fuselage 102 and a stowable wing assembly 104 comprising a selectively rotatable wing body 105 and a plurality of wings 106 extending therefrom. Each wing 106 comprises a pylon 108 comprising a rotor assembly 110 having a plurality of rotor blades 112 coupled thereto. Each pylon 108 is selectively pivotable between a horizontal orientation and a vertical orientation with respect to the fuselage 102 and associated wing 106 to adjust the thrust angle and transition the aircraft 100 between an airplane mode and a helicopter mode. Accordingly, the airplane mode is associated with a more horizontally-oriented thrust angle and propelling the aircraft 100 forward in flight, while the helicopter mode is associated with a more vertically-oriented thrust angle and propelling the aircraft 100 to and from a landing area.

Aircraft 100 also comprises a drive component carried in the fuselage 102. In the embodiment shown, the drive component comprises an internal combustion engine 120 coupled to an engine reduction gearbox ("ERGB") 122 comprising a retractable driveshaft 124. However, in other embodiments, the drive component may comprise a direct-drive electric motor, a direct-drive engine, a motor and gearbox combination, or an engine and a redirection gearbox, each comprising a retractable driveshaft 124. In the embodiment shown, operation of the internal combustion engine 120 causes the retractable driveshaft 124 to rotate about its rotation axis 126. The retractable driveshaft 124 is selectively extended and retracted axially along rotation axis 126 to engage (shown in FIG. 1) and disengage (shown in FIG. 2) from an auxiliary or mid-wing gearbox ("MWGB") 130 disposed within the selectively rotatable wing body 105 of the wing assembly 104. The retractable driveshaft 124 may be actuated electrically, electro-mechanically, hydraulically, and/or mechanically. While in the embodiment shown, the retractable driveshaft 124 is selectively actuated and retracted vertically with respect to the fuselage 102, in other embodiments, the retractable driveshaft 124 may be selectively actuated and retracted longitudinally along a length of the fuselage 102 and/or laterally with respect to the fuselage 102. The MWGB 130 is operatively coupled to an interconnect driveshaft 132 extending therefrom through each wing 106 to a pylon gearbox 134 disposed in each pylon 108. Each pylon gearbox 134 is coupled to the associated rotor assemblies 110 through a rotor mast 136.

Aircraft 100 further comprises a wing assembly rotation system 140 configured to selectively rotate the wing assembly 104 with respect to the fuselage 102 about stow axis 142. Most notably, the stow axis 142 is offset from the rotation axis 126 of the retractable driveshaft 124. More specifically, the stow axis 142 is displaced longitudinally along a length of the fuselage 102 with respect to the rotation axis 126 of the retractable driveshaft 124. In some embodiments, the offset between the stow axis 142 and rotation axis may be about twelve inches. By offsetting the stow axis 142 towards a more forward portion of the wing assembly 104, rotation of the wing assembly 104 occurs about the stow axis 142 in a thicker, more structurally rigid portion of the wing assembly 104, thereby providing maximum support to the wing assembly 104 during flight. Additionally, as will be discussed further herein, it will be appreciated that since the retractable driveshaft 124 extends at least partially into the wing body 105 of the wing assembly 104 when the retractable driveshaft 124 is engaged with the MWGB 130, the retractable driveshaft 124 is configured to allow for rotation of the wing assembly 104 by selectively disengaging from the MWGB 130.

As shown in FIG. 1, the retractable driveshaft 124 is selectively extended vertically and engaged with the MWGB 130, and the wing assembly 104 is configured in the flight position. Thus, when the retractable driveshaft 124 is engaged with the MWGB 130 as shown in FIG. 1, rotation of the retractable driveshaft 124 imparted by the internal combustion engine 120 is transmitted through the MWGB 130 to the interconnect driveshafts 132 and the rotor masts to impart rotation to the counter-rotating rotor assemblies 110. As shown in FIG. 2, the retractable driveshaft 124 is selectively retracted and disengaged with the MWGB 130, and the wing assembly is 104 configured in a stowed position. After the retractable driveshaft 124 is disengaged with the MWGB 130, the wing assembly 104 may be selectively rotated by the wing assembly rotation system 140 relative to the fuselage 102 about the stow axis 142 in a clockwise direction as viewed from the top of the aircraft 100 until the wing assembly 104 reaches the stowed position. In the stowed position, it will be appreciated that the retractable driveshaft 124 is misaligned from the MWGB 130. Accordingly, when the retractable driveshaft 124 is disengaged from the MWGB 130, rotation of the retractable driveshaft 124 will not impart rotation to the rotor assemblies 110.

In some embodiments, the stowed configuration of the wing assembly 104 may be reached after the wing assembly 104 is rotated about ninety degrees. Furthermore, in some embodiments, it will be appreciated that the wing assembly 104 may be rotated relative to the fuselage 102 about the stow axis 142 in a counter-clockwise direction. It will be appreciated that rotation of the wing assembly 104 allows the aircraft 100 to be parked, stowed, and/or driven into an entrance of a hangar while reducing the overall footprint of the aircraft 100, thereby allowing for more compact storage of aircraft 100 and increased storage capacity of multiple aircraft 100. Additionally, as will be discussed later herein, aircraft 100 also comprises a stow seal 150 connected to each of the ERGB 122 and the MWGB 130 that forms a seal between the ERGB 122 and the MWGB 130 when the wing assembly 104 is configured in each of the flight position and the stowed position and during rotation of the wing assembly 104 between the flight position and the stowed position.

Figure 3:
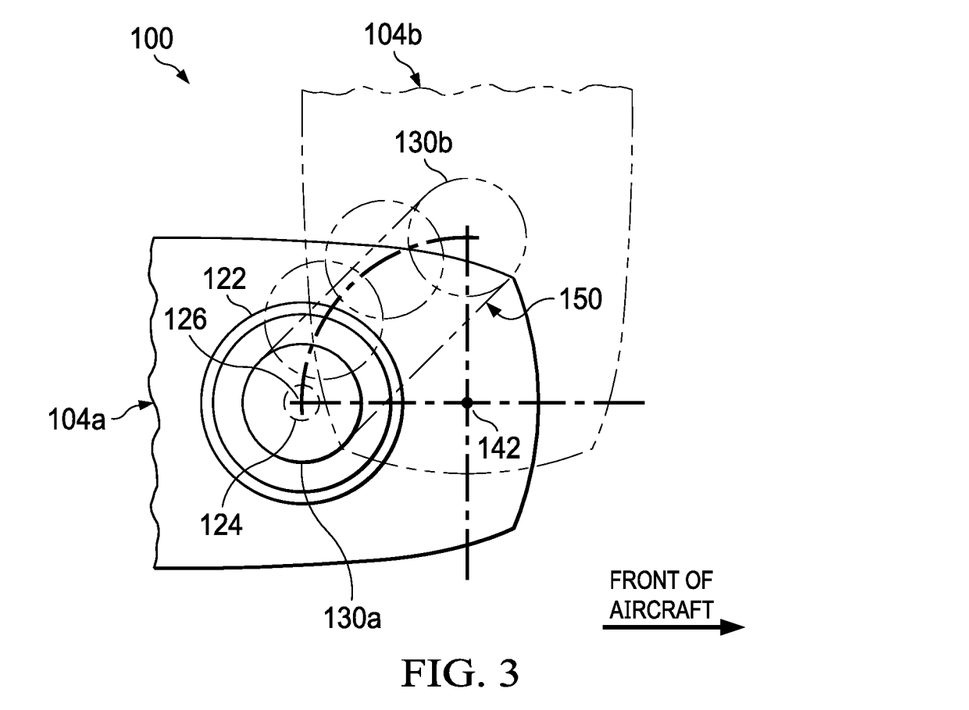
FIG. 3 is a top view of the position of a mid-wing gearbox ("MWGB") during rotation of the wing assembly of the aircraft of FIGS. 1 and 2.

Referring now to FIG. 3, a top view of the position of the MWGB 130 during rotation of the wing assembly 104 of the aircraft 100 of FIGS. 1 and 2 is shown according to this disclosure. As shown, the wing assembly 104 may be rotated relative to the fuselage 102 about the stow axis 142 between the flight position 104a (corresponding to FIG. 1) and the stowed position 104b (corresponding to FIG. 2). In this embodiment, the wing assembly 104 is rotated about ninety degrees between the flight position 104a and the stowed position 104b. Additionally, since the MWGB 130 is disposed within the wing assembly 104, the MWGB 130 sweeps along a radial path defined by the distance of the MWGB 130 from the stow axis 142. In some embodiments, the offset between the rotation axis 126 and the stow axis 142 may be about twelve inches, such that the MWGB 130 sweeps along a twelve inch radial path with respect to the stow axis 142. Thus, the MWGB 130 is rotated between the flight position 130a (flight position 104a of the wing assembly 104), where the MWGB 130 is aligned with the retractable driveshaft 124, and the stowed position 130b (stowed position 104b of the wing assembly 104), where the MWGB 130 is misaligned with the retractable driveshaft 124.

Additionally, the seal 150 allows the retractable driveshaft 124 to be selectively retracted and disengaged from the mid-wing gearbox without exposing the inside of the ERGB 122 and/or the MWGB 130 to elements in the outside environment. More specifically, while maintaining a sealed connection to the ERGB 122, the end of the seal 150 connected to the MWGB 130 moves with the MWGB 130 during its sweep in order to maintain the seal between the ERGB 122 and the MWGB 130 and when the wing assembly 104 and MWGB 130 are in their respective flight positions 104a, 130a and stowed positions 104b, 130b. Thus, the seal 150 is configured to maintain a seal between the ERGB 122 and the MWGB 130 both when the MWGB 130 is aligned with the retractable driveshaft 124 and during rotation of the wing assembly 104 until the MWGB 130 is misaligned with the retractable driveshaft 124.

Figure 4A:
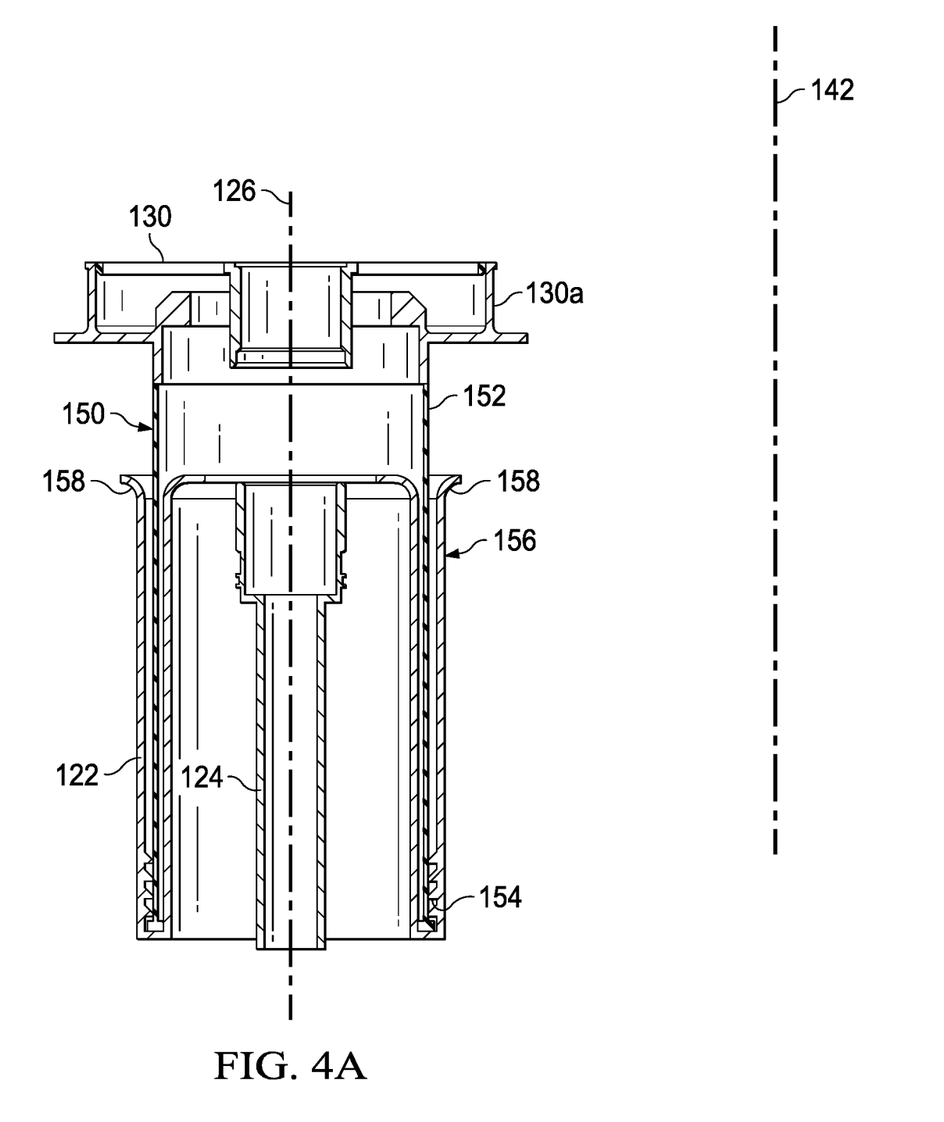
FIG. 4A is a cross section of a seal of FIGS. 1-3 with the MWGB in the flight position.
Figure 4B:
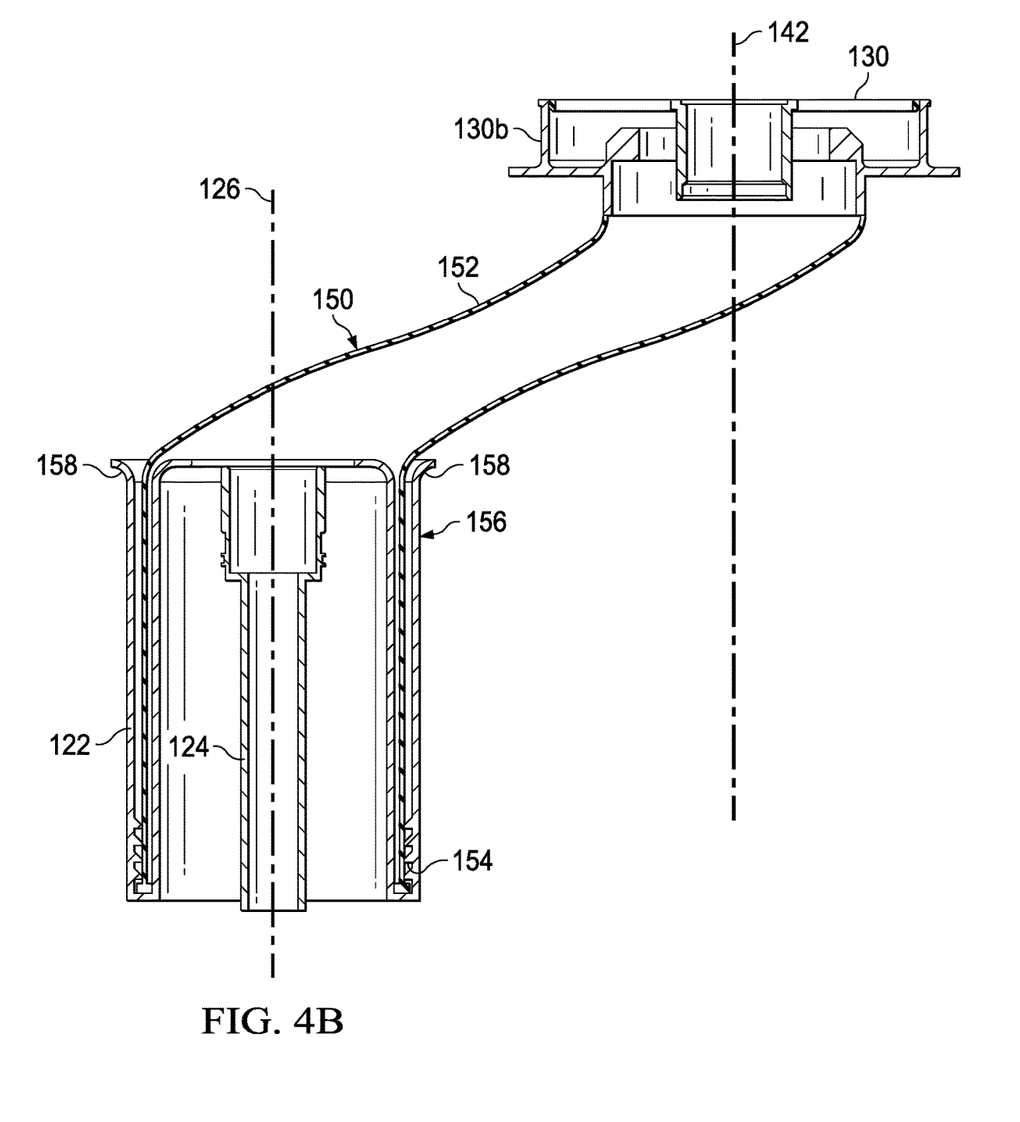
FIG. 4B is a cross section of the seal of FIGS. 1-4A with the MWGB in the stowed position.

Referring now to FIGS. 4A and 4B, a cross section of the seal 150 of FIGS. 1-3 is shown with the MWGB 130 in the flight position 130a and the stowed position 130b, respectively. As stated, seal 150 is configured to maintain a sealed connection between the ERGB 122 and the MWGB 130 when the MWGB 130 is configured in the flight position 130a (FIG. 4A) and the stowed position (FIG. 4B) and transitions between the two. Seal 150 generally comprises an outstretched material sleeve 152, a spring 154, and a seal guide 156 comprising a flared opening 158. The sleeve 152 may generally be formed from an elastomeric or otherwise pliable material that allows the sleeve 152 to flex and bend without inwardly collapsing or kinking when the MWGB 130 is moved between positions 130a, 130b. The spring 154 may be disposed within the seal guide 156 and/or between the seal guide 156 and a portion of the ERGB 122 and is configured to bias the sleeve 152 towards the ERGB 122. In the embodiment shown, the spring 154 is disposed in a bottom of the seal guide 156. However, in some embodiments, the spring 154 may extend at least partially along a length of the sleeve 152. In other embodiments, the spring 154 may extend along an entirety of the length of the sleeve 152 in a helical configuration and configured to bias the sleeve 152 towards the ERGB 122. The seal guide 156 is configured to provide a channel of travel for the sleeve 152. The seal guide 156 extends at least up to a free end of the retractable driveshaft 124 when the retractable driveshaft is disengaged from the MWGB 130, such that the seal guide 156 and its flared opening 158 prevent contact and/or binding of the sleeve 152 on the free end of the retractable driveshaft 124.

In operation, seal 150 is configured to retain oil or other lubricants used to lubricate the ERGB 122, the retractable driveshaft 124, and/or the MWGB 130 within the seal 150. The seal 150 also prevent contaminants from the outside environment from contaminating the ERGB 122, the retractable driveshaft 124, and/or the MWGB 130 when the retractable driveshaft 124 is disengaged from the MWGB 130 and the MWGB 130 is selectively rotated to the stowed position 130b. As the MWGB 130 is transitioned to the stowed position 130b, the spring 154 biases the sleeve 152 towards the EGRB 122 to maintain tension in the sleeve 152 as the sleeve 152 is pulled along the sweep of the MWGB 130 and rides up the seal guide 156. Further, the flared opening 158 provides a smooth, rounded transition for the sleeve 152 to avoid damaging the sleeve 152 as the sleeve 152 is pulled towards the stowed position 130b of the MWGB 130. As the MWGB 130 is transitioned to the flight position 130a, the spring 154 biases the sleeve 152 towards the ERGB 122 to retract the sleeve 152 through the seal guide 156 towards the EGRB 122. The smooth, rounded transition of the flared opening 158 aids in smoothly feeding the sleeve 152 into the seal guide 156 without damaging the sleeve 152. As such, seal 150 maintains a sealed connection between the ERGB 122 and the MWGB 130 at all times.

Figure 5A:
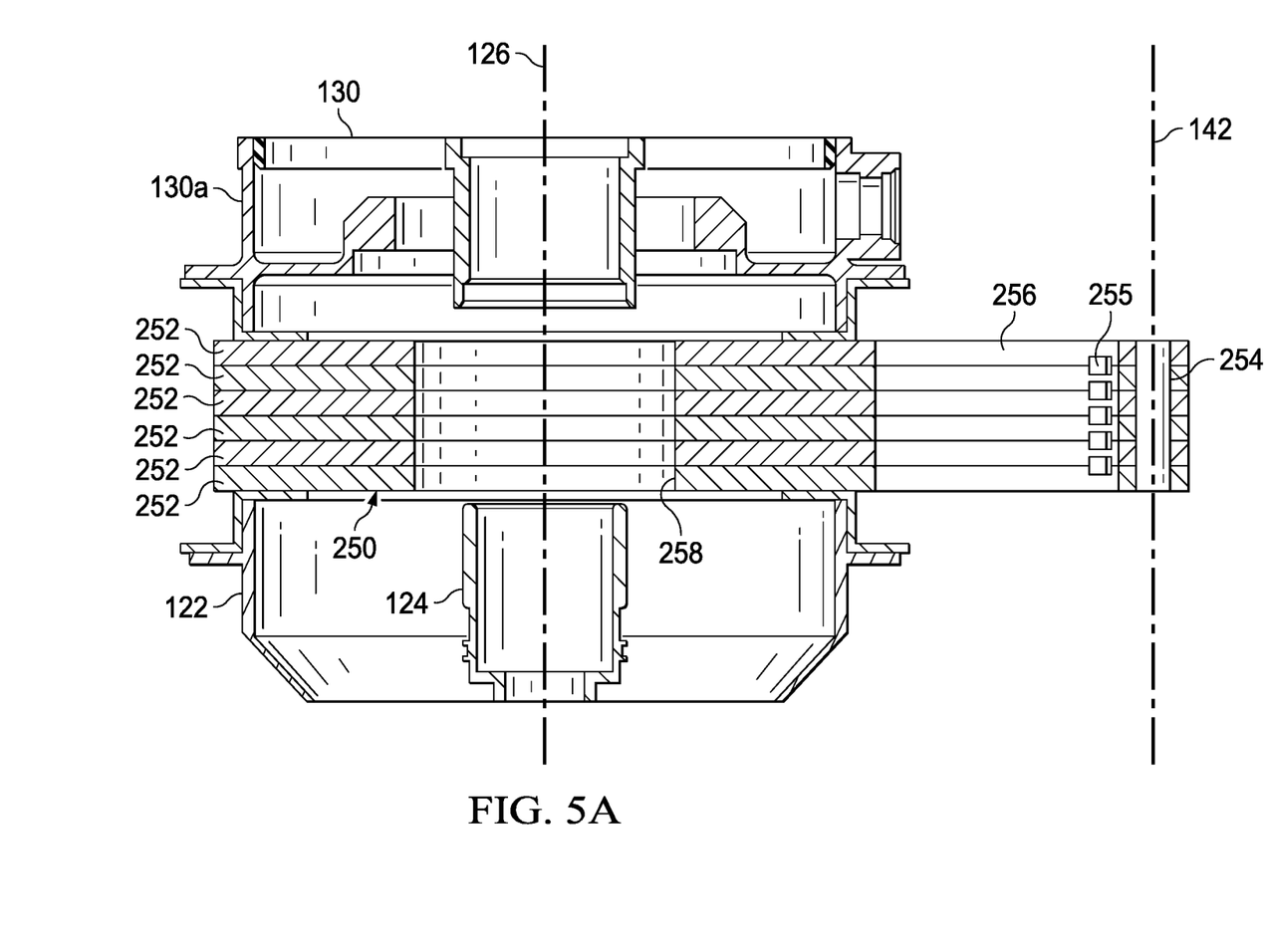
FIG. 5A is a cross section of another embodiment of a seal with the MWGB in the flight position according to this disclosure.
Figure 5B:
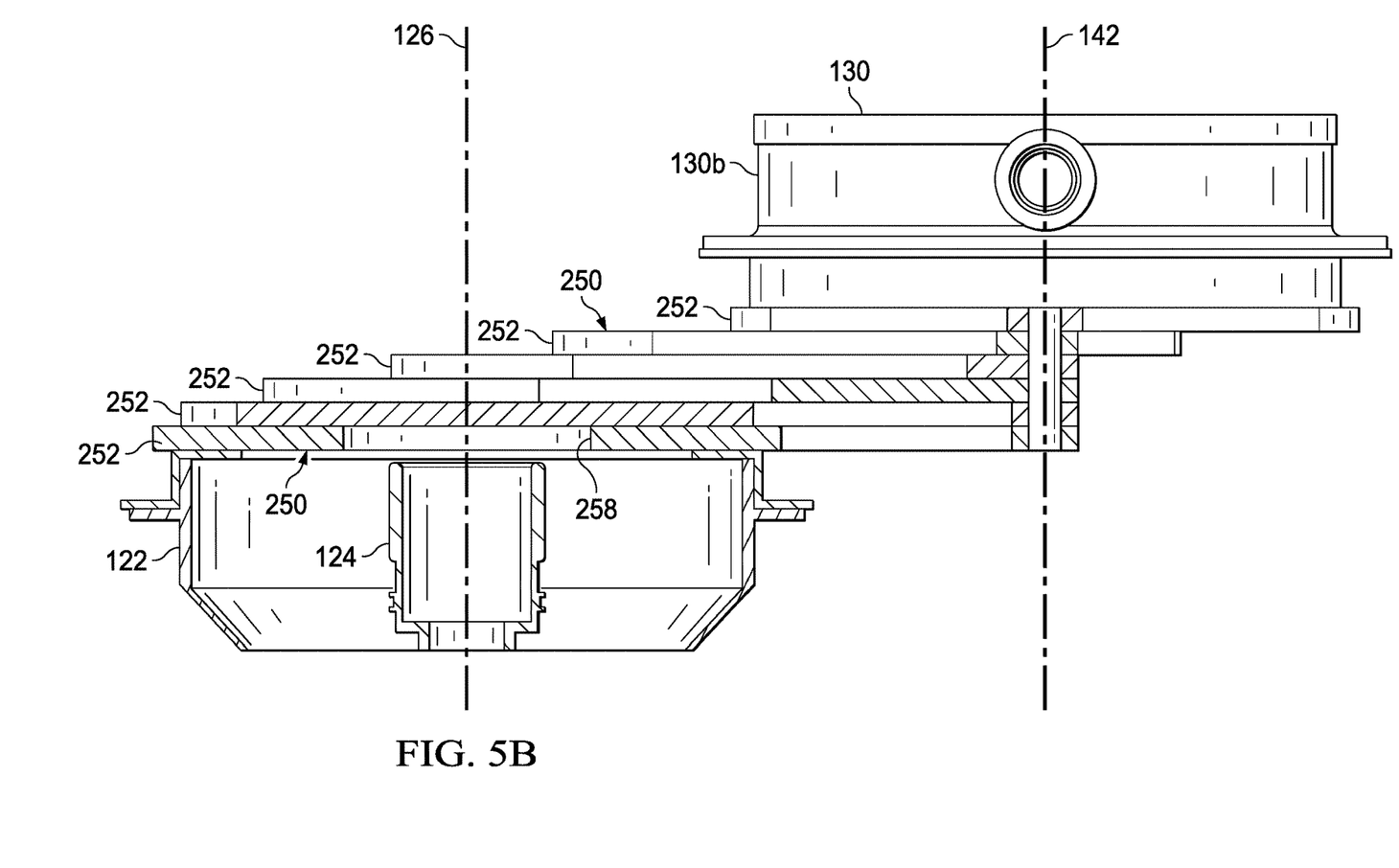
FIG. 5B is a cross section of the seal of FIG. 5A with the MWGB in the stowed position.
Figure 5C:
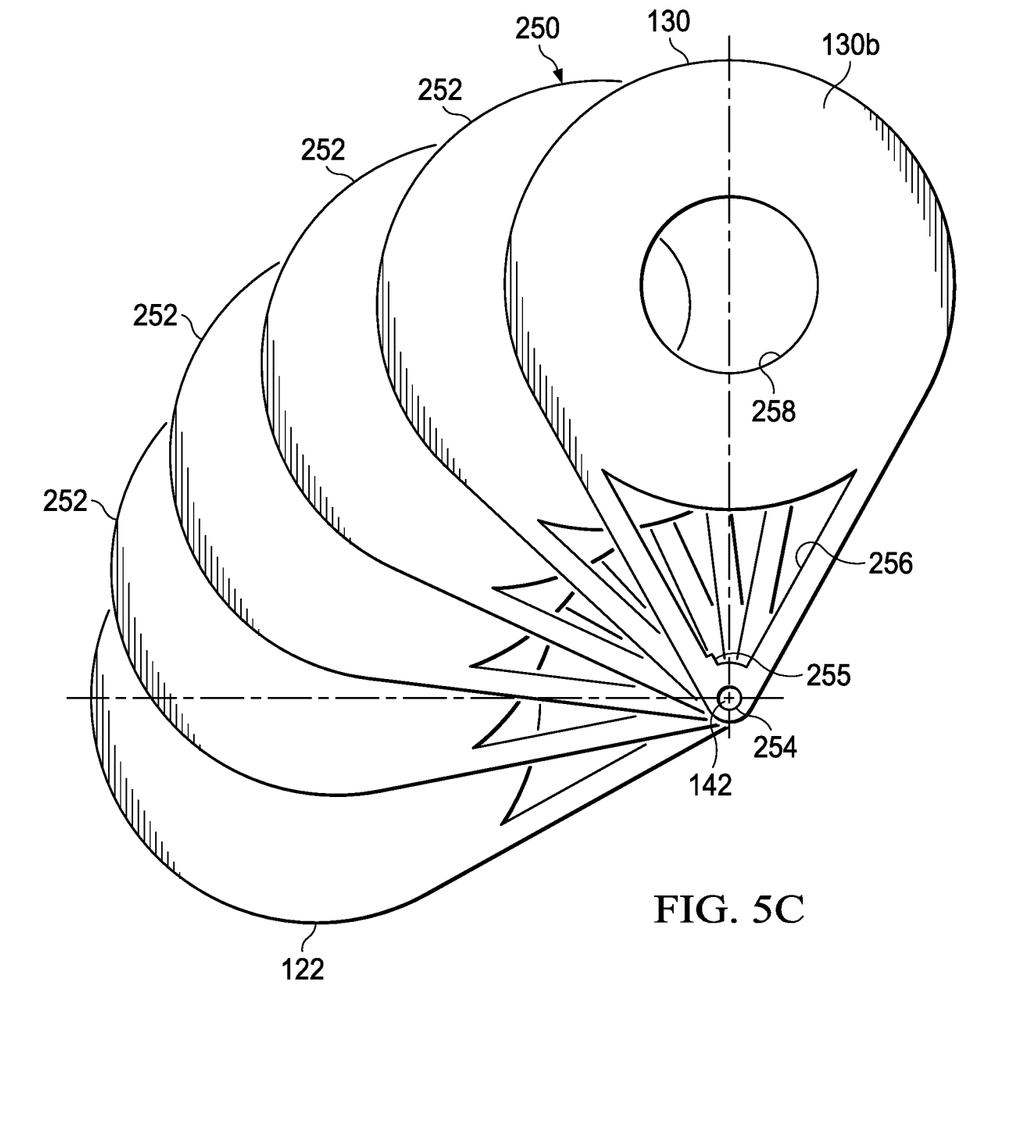
FIG. 5C is a top view of the seal of FIGS. 5A and 5B with the MWGB in the flight position.

Referring now to FIGS. 5A, 5B, and 5C, a cross section of another embodiment of a seal 250 with the MWGB 130 in the flight position 130a, a cross section of the seal 250 with the MWGB 130 in the stowed position 130b, and a top view of the seal 250 with the MWGB 130 in the flight position 130a are shown, respectively, according to this disclosure. Seal 250 is configured to perform a substantially similar function as seal 150 and may be used in aircraft 100 in place of seal 150. Seal 250 generally comprises a plurality of substantially flat, overlapping parallel plates 252 that collectively form the sealed connection between the ERGB 122 and the MWGB 130. However, in other embodiments, plates 252 may comprise a flexible material (e.g. rubber, silicone, etc.) disposed between adjacent plates 252 to form the sealed connection. The plates 252 may generally be formed from aluminum, titanium, or plastic (e.g. Delrin). Each plate 252 comprises a guide hole 254 concentric with the stow axis 142 about which each plate selectively rotates when the wing assembly 104 is rotated. Further, in some embodiments, the guide hole 254 may be configured to receive a stow shaft that may rotate the wing assembly 104. Each plate also includes a tang 255, a tang interface 256, and a driveshaft hole 258. The tang 255 generally comprises a portion of the plate 252 that extends in a downward direction below a bottom surface of the respective plate 252 configured to interact with the tang interface 256 of the adjacently lower plate 252. The tang interface 256 comprises a cutout or removed portion of the plate 252 configured to receive the tang 255 of the adjacently higher plate 252. Accordingly, each tang 255 extends into the tang interface 256 of an adjacently lower plate 252. Further, the driveshaft holes 258 of the plates 252 are configured to align when the MWGB 130 is in the flight position 130a to receive the retractable driveshaft 124 therethrough.

In operation, the series of plates 252 are generally configured to sequentially deploy and splay out to maintain a sealed connection between the ERGB 122 and the MWGB 130. As the MWGB 130 is transitioned to the stowed position 130b, the tang 255 of an adjacently upper plate 252 is configured to contact a surface the tang interface 256 of the adjacently lower plate 252 to rotate the adjacently lower plate 252. Based on the geometry of the tang interface 256 of each plate 252, each plate 252 is configured to rotate at least partially about the stow axis 142 prior to the tang 255 of the adjacently upper plate 252 contacting the tang interface 256 of the adjacently lower plate 252. Accordingly, this allows the plates 252 to sequentially deploy, thereby progressively closing the connection between the driveshaft holes 258 of adjacent plates 252 when the MWGB 130 is moved to the stowed position 130b. Thus, when the MWGB 130 reaches the stowed position 130b, the driveshaft holes 258 of the plates 252 are misaligned. The misalignment allows the seal 250 to retain oil or other lubricants used to lubricate the ERGB 122, the retractable driveshaft 124, and/or the MWGB 130 within the seal 250 and prevent contaminants from the outside environment from contaminating the ERGB 122, the retractable driveshaft 124, and/or the MWGB 130.

Similarly, as the MWGB 130 is transitioned to the flight position 130a, the tang 255 of an adjacently upper plate 252 contacts an opposing surface (used to deploy the plates 252) of the tang interface 256 of the adjacently lower plate 252 to rotate the adjacently lower plate 252 towards the flight position 130a. Again, the geometry of the tang interface 256 of each plate is configured to allow the adjacently upper plate 252 to rotate at least partially about the stow axis 142 prior to the tang 255 of the adjacently upper plate 252 contacting the tang interface 256 of the adjacently lower plate 252. This allows the plates 252 to sequentially retract, thereby progressively opening the connection between the driveshaft holes 258 of adjacent plates 252 when the MWGB 130 is moved to the flight position 130a. As such, it will be appreciated that the location and/or geometry of the tangs 255 is configured such that when the MWGB 130 reaches the flight position 130a, the driveshaft holes 258 and the plates 252 are substantially realigned along the rotation axis 126 of the retractable driveshaft 124, so that the retractable driveshaft can engage the MWGB 130 without interference. Thus, seal 250 maintains a sealed connection between the ERGB 122 and the MWGB 130 at all times.

Figure 6A:
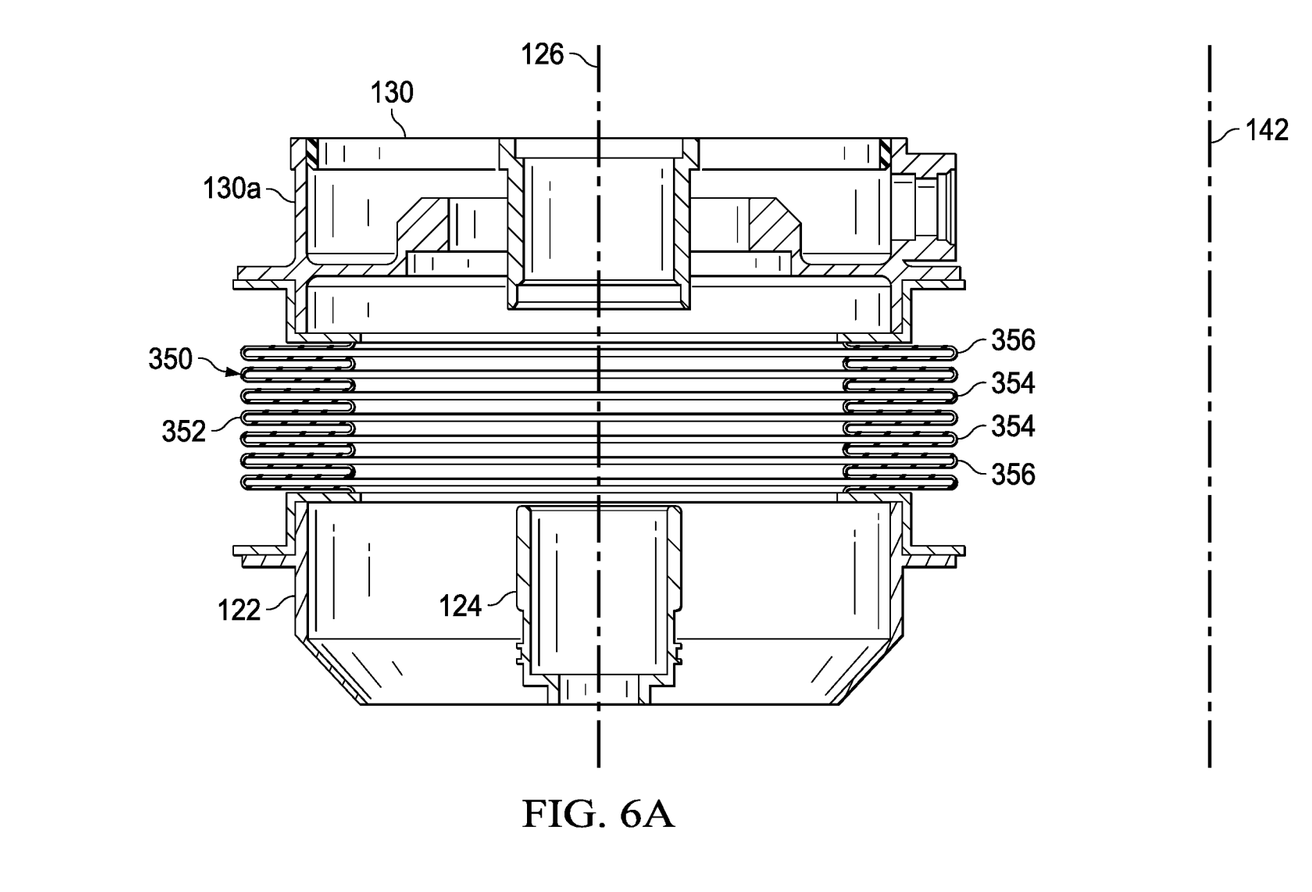
FIG. 6A is a cross section of yet another embodiment of a seal with the MWGB in the flight position according to this disclosure.
Figure 6B:
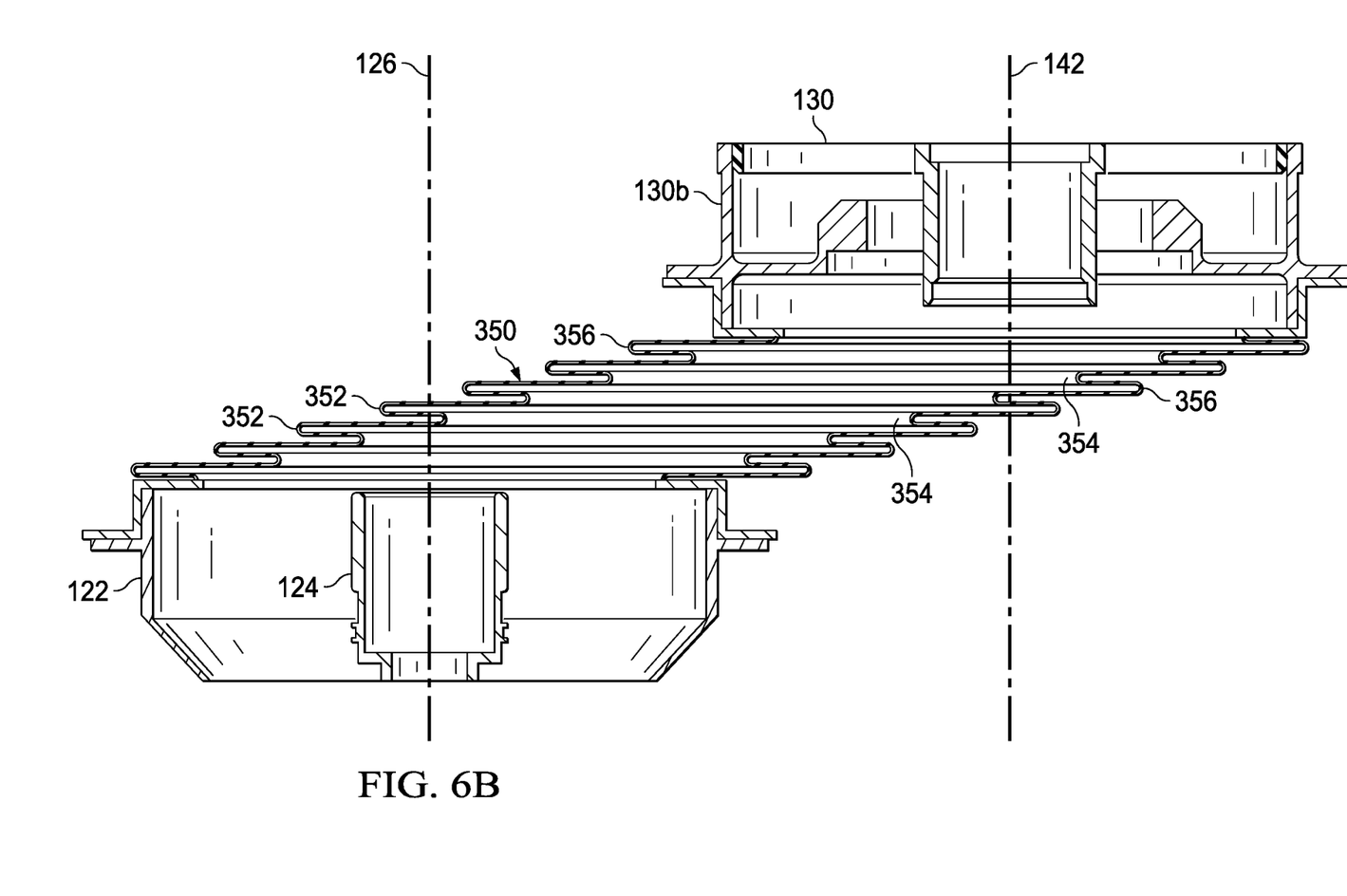
FIG. 6B is a cross section of the seal of FIG. 6A with the MWGB in the flight position.

Referring now to FIGS. 6A and 6B, a cross section of yet another embodiment of a seal 350 is shown with the MWGB 130 in the flight position 130a and the stowed position, respectively. Seal 350 is substantially similar to seal 150 and seal 250 and may be used in aircraft 100 in a substantially similar manner. Seal 350 generally comprises an outer material sleeve 352 and a plurality of support rings 354 that cause the sleeve 352 to form a series of overlapping folds 356 of the seal 350. The sleeve 352 may generally be formed from an elastomeric or otherwise pliable material that allows the sleeve 352 to flex and bend without collapsing or kinking when the MWGB 130 is moved between positions 130a, 130b. The support rings 354 may generally be formed from titanium or another thin, lightweight yet strong pliable material. The support rings 354 may generally comprise a plurality of parallel rings (one associated with each overlapping fold 356) that are configured to maintain the order and integrity of the overlapping folds 356 when the MWGB 130 is transitioned between positions 130a, 130b. However, in some embodiments, the support rings 354 may be connected or form a single helical structure. As such, the overlapping folds 356 would conform to the shape of the support rings 354 and be helical overlapping folds 356.

In operation, as the MWGB 130 is transitioned to the stowed position 130b, the overlapping folds 356 may begin to sequentially deploy or splay based on the stiffness of the seal 350. This is generally caused by tailoring the stiffness of the sleeve 352 and/or configuration of the support rings 354. Additionally, each overlapping fold 356 is configured to prevent full extension and thus extend only partially in a lateral direction with respect to the rotation axis 126 and stow axis 142 when the seal 350 is moved with the MWGB 130. This ensures that the structure of the seal 350 is maintained when the MWGB 130 is in the stowed position 130b, such that when the MWGB 130 is rotated back to the flight position 130a the support rings 354 do not overlap vertically, thereby potentially damaging the seal 350. This further ensures that the sleeve 352 will fold back into the series of overlapping folds 356 when the MWGB 130 is returned to the flight position 130a. Therefore, as the MWGB 130 is transitioned to the flight position 130*a*, the overlapping folds 356 have not fully extended, allowing tension in the seal 350 to sequentially retract the overlapping folds 356 of the sleeve 352, thereby progressively reforming the series of overlapping folds 356 when the MWGB 130 is moved to the flight position 130*a*. Additionally, since the overlapping folds 356 have not fully extended, overlap in the support rings further ensures that the sleeve 352 and overlapping folds 356 will return to their proper order when the seal 350 is retracted. Accordingly, in this manner, seal 350 is capable of maintaining a sealed connection between the ERGB 122 and the MWGB 130 at all times.

It will be appreciated that the retractable driveshaft 124 may be extended and retracted in any direction depending on the configuration of the aircraft 100. Additionally, while the seals 150, 250, 350 are disclosed for use with retractable driveshaft 124 and rotatable wing assembly 104 of aircraft 100, it will further be appreciated that seals 150, 250, 350 may be used in other vehicles and/or pieces of machinery that require a selectively retractable driveshaft 124 that may be selectively extended and retracted to engage an auxiliary gearbox disposed in a movable component of the vehicle and/or piece of machinery, such that when the selectively retractable driveshaft 124 is disengaged from the auxiliary gearbox, the movable component of the vehicle and/or other piece of machinery may be selectively rotated, translated, or both. Thereby, the overall footprint of the vehicle and/or piece of machinery is reduced, allowing for more compact storage of the vehicle and/or piece of machinery while the seals 150, 250, 350 maintain a sealed connection that provides protection from the outside environmental elements.

Figure 7:
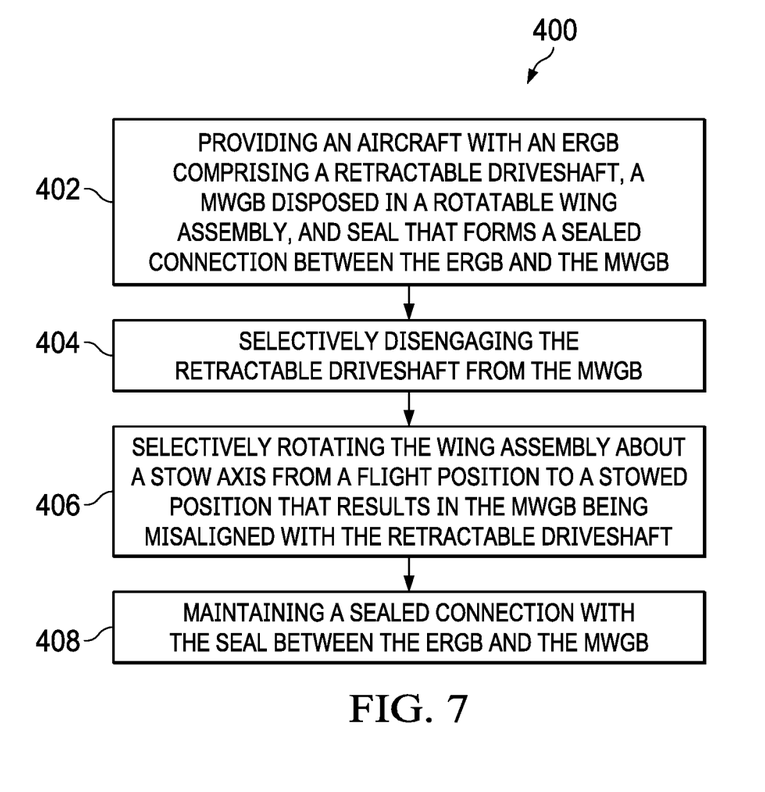
FIG. 7 is a flowchart of a method of operating an aircraft according to this disclosure.

Referring now to FIG. 7, a flowchart of a method 400 of operating an aircraft 100 is shown according to this disclosure. Method 400 begins at block 402 by providing an aircraft 100 with an ERGB 122 comprising a retractable driveshaft 124, a MWGB 130 disposed in a rotatable wing assembly 104, and seal 150, 250, 350 that forms a sealed connection between the ERGB 122 and the MWGB 130. Method 400 may continue at block 404 by selectively disengaging the retractable driveshaft 124 from the MWGB 130. Method 400 may continue at block 406 by selectively rotating the wing assembly 104 about a stow axis 142 from a flight position 104*a* to a stowed position 104*b* that results in the MWGB 130 being misaligned (stowed position 130*b*) with the retractable driveshaft 124. Method 400 may conclude at block 408 by maintaining a sealed connection with the seal 150, 250, 350 between the ERGB 122 and the MWGB 130. Furthermore, in some embodiments, the method 400 may comprise selectively rotating the wing assembly 104 about the stow axis 142 from the stowed position 104*b* to the flight position 104*a* to realign the MWGB 130 (flight position 130*a*) with the retractable driveshaft 124, and maintaining a sealed connection with the seal 150, 250, 350 between the ERGB 122 and the MWGB 130 during transition of the wing assembly 104 from the stowed position 104*b* to the flight position 104*a*.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. An aircraft seal, comprising:
    a first end coupled to a drive component carried in a fuselage of an aircraft, the drive component comprising a retractable driveshaft;
    a second end coupled to a gearbox carried in a wing assembly of the aircraft;
    wherein the aircraft seal is configured to deploy in order to maintain a sealed connection between the drive component and the gearbox in response to rotation of the gearbox about a stow axis that is offset from a rotation axis of the retractable driveshaft.

2. The aircraft seal of claim 1, wherein the seal is configured to retract in response to rotation of the wing assembly about the stow axis from the stowed position to the flight position.

3. The aircraft seal of claim 1, wherein the seal comprises a sleeve and at least one component configured to bias the sleeve towards the drive component.

4. The aircraft seal of claim 3, wherein the component is a spring disposed between a seal guide and the drive component.

5. The aircraft seal of claim 3, wherein the component is a plurality of support rings that cause the seal to form a series of overlapping folds.

6. The aircraft seal of claim 1, wherein the seal comprises a plurality of overlapping parallel plates configured to sequentially deploy and retract to maintain the sealed connection between the drive component and the gearbox.

7. An aircraft, comprising:
    a fuselage;
    a wing assembly comprising a mid-wing gearbox ("MWGB"), the wing assembly being rotatable relative to the fuselage about a stow axis between a flight position and a stowed position;
    a drive component comprising a retractable driveshaft configured to selectively engage the MWGB via axially translatable motion along a rotation axis of the retractable driveshaft that is offset from the stow axis; and a seal coupled to the drive component at a first end and the MWGB at a second end and configured to deploy in order to maintain a sealed connection between the drive component and the MWGB in response to rotation of the wing assembly about the stow axis from the flight position to the stowed position.

8. The aircraft of claim 7, wherein the seal is configured to retract in response to rotation of the wing assembly about the stow axis from the stowed position to the flight position.

9. The aircraft of claim 8, wherein the retractable driveshaft of the drive component is aligned with the MWGB when the wing assembly is in the flight position, and wherein the retractable driveshaft of the drive component is misaligned with the MWGB when the wing assembly is in the stowed position.

10. The aircraft of claim 9, wherein the seal comprises a sleeve and a spring configured to bias the sleeve towards the drive component as the sleeve is deployed and retracted.

11. The aircraft of claim 10, wherein the seal comprises a seal guide configured to provide a channel of travel for the sleeve.

12. The aircraft of claim 9, wherein the seal comprises a plurality of overlapping parallel plates configured to sequentially deploy and retract to maintain the sealed connection between the drive component and the MWGB.

13. The aircraft of claim 12, wherein each plate comprises a tang configured to interact with a tang interface of an adjacently lower plate to sequentially deploy the adjacently lower plate.

14. The aircraft of claim 13, wherein each plate is configured to rotate at least partially about the stow axis prior to the tang of an adjacently upper plate contacting the tang interface of the adjacently lower plate.

15. The aircraft of claim 14, wherein each plate further comprises a driveshaft hole disposed through the plate, wherein the driveshaft holes of the plurality of plates are aligned when the wing assembly is in the flight position, and wherein the driveshaft holes of the plurality of plates are misaligned when the wing assembly is in the stowed position.

16. The aircraft of claim 9, wherein the seal comprises an outer sleeve and a plurality of support rings that cause the sleeve to form a series of overlapping folds.

17. The aircraft of claim 16, wherein the support rings are configured to maintain order of the overlapping folds when the wing assembly transitions between the flight position and stowed position.

18. The aircraft of claim 17, wherein the overlapping folds are configured to sequentially deploy and retract to maintain the sealed connection between the drive component and the MWGB.

19. The aircraft of claim 18, wherein each overlapping fold is configured to extend only partially in a lateral direction with respect to the rotation axis when the seal is deployed.

20. The aircraft of claim 9, wherein the seal is configured to retain oil or other lubricants used to lubricate at least one of the drive component, the retractable driveshaft, and the MWGB within the seal, while preventing contaminants from the outside environment from entering the seal.

* * * * *